Jan. 8, 1929.  
O. BOREL  
1,698,358  
MAXIMUM LOAD ELECTRICITY METER  
Filed Dec. 16, 1927
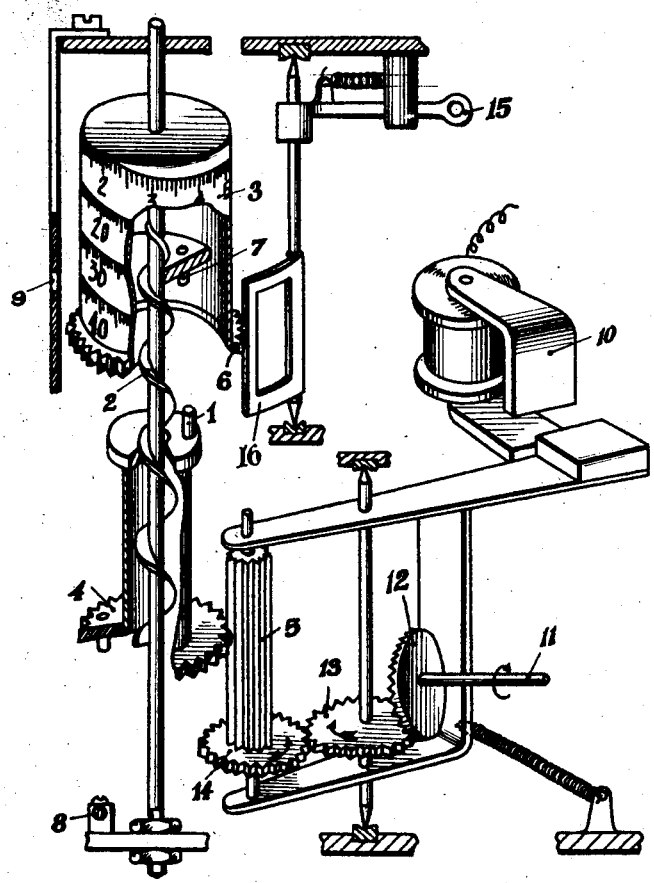
INVENTOR.  
O. Borel  
BY Marks & Clerk  
ATTORNEYS.

Patented Jan. 8, 1929.

1,698,358

UNITED STATES PATENT OFFICE.

ONÉSIME BOREL, OF GENEVA, SWITZERLAND, ASSIGNOR TO THE FIRM SOCIETE GENE-VOISE D'INSTRUMENTS DE PHYSIQUE, OF GENEVA, SWITZERLAND.

MAXIMUM-LOAD ELECTRICITY METER.

Application filed December 16, 1927, Serial No. 240,565, and in Switzerland December 17, 1926.

This invention relates to electricity meters for recording the maximum load over a definite period of working. Electricity meters are well known in which the maximum of the average load of an installation is controlled and recorded with respect to a very short period of observation. The principle on which such meters operate is usually the following: In addition to an integrating meter for effective kilowatt-hours, there is provided a series of toothed wheels which act upon an indicating needle by the intermediary of a push finger arranged in the prolongation of the centre line of the indicating needle. At the end of each recording period the push finger, which is subjected to the action of a spring, is brought back to its initial starting position, either mechanically or by means of a magnetic relay governed by the motion of a clock-work. The indicating needle being restrained by light friction remains in the position attained. This action is repeated every quarter or half hour and after a period of usually a month the needle will indicate the maximum load attained during this time. The more the push finger advances, the more does the retarding action of the spring come into play, and if, for example, after a period of heavy overload a period of very light load follows, the meter may indicate negative errors which influence just as much the maximum indicator as the kilowatt-hour indicator.

The object of the present invention is to overcome this disadvantage of the known arrangements. The new construction is shown diagrammatically in the accompanying drawing in a partial perspective view. Although the meter according to this invention is based on the same general principles as are set forth above, it differs from the known arrangement in that the push finger 1, instead of being subjected to the increasing tension of a spring, is raised along an inclined surface 2, in the form of a screw of very deep pitch, and of which the average inclination corresponds to an angle of about 25°. On the upper prolongation of the axis, and concentric with the screw, there is arranged a figured and graduated drum 3 provided with a driving finger 7 which, when reached by the push finger 1 describes an upward and rotary motion along the inclined surface represented by the flat thread 2 of the screw. The push finger 1 is driven at intervals by a toothed wheel 4, thereon gearing with a long toothed pinion 5, this latter being driven from the spindle 11 of the integrating kilowatt-hour meter, through toothed wheel 12 and gears 13 and 14.

When after a recording period, the toothed wheel 4 is disengaged from the long toothed pinion 5 by the action of the relay 10, the push finger descends by gravity down the screw 2 and is stopped at its initial position, which can be regulated by the stop 8. The figured and graduated drum 3, does not follow because it is retained in its position by means of a ratchet 6, which may be toothed to correspond with the division of the figured drum. Assuming a drum of 20 mm. diameter, capable of ascending four threads of the screw, a length of 290 mm. of helicoidal scale is obtained which is equivalent to the length of a single circular dial of 110 mm. diameter of which usually only 300° can be utilized. Such a dial would cover the whole useful surface of the dial plate of the meter and its central location would complicate the arrangement of a meter with several sets of counters.

The helicoidally divided drum is preferably placed on the left side of the counter and readings are taken through a small opening as at 9, provided with a line or sighting pointer similar to those used on slide-rules.

During the next period of recording, the long pinion 5 is driven from the integrating kilowatt-hour meter at a speed proportional to the total current flowing through the meter. The toothed wheel 4 engaging the pinion 5 leaves the stop 8 and is raised along the screw 2. If the average load during this second recording period has been lower than during the first period, the toothed wheel 4 will be disengaged by the relay 10 without having reached the driving finger 7, and will redescend to the stop 8. If the third recording period corresponds to a higher load (for example 50% higher) than the first period, and if for example the recording period is 15 minutes, the driving finger 7 is reached after 10 minutes of meter motion and thereafter the drum 3 is advanced to a scale reading corresponding to a 50% higher load than during the first period.

This action is repeated in the same manner every quarter of an hour during a period of a month or more. The indication of the drum 3 is then written down by a meter superintendent who then disengages the figured drum 3 from the pawl 16 by pushing against the button 15; the pinion 5 is also disengaged from the wheel 4 so that the drum 3 and the driving device return each to their zero positions.

Instead of having a helicoidally graduated scale the drum 3 might be divided for instance only into 100 graduations while it would move in front of a longitudinal opening provided with a graduation corresponding to the pitch of the helicoidal surface.

What I claim is:

1. In an electricity meter for maximum load indication, a helicoidal surface, a graduated drum slidably mounted on said helicoidal surface, a driving member adapted to engage said graduated drum and to rise with it along said helicoidal surface, and means to periodically disengage said driving member from said drum, whereby the drum stays in its attained position while the driving member redescends the helicoidal surface owing to its weight.

2. In an electricity meter for maximum load indication, a helicoidal surface, a driving member adapted to rise along said helicoidal surface, and a figured and graduated drum provided with a scale which is a helicoidal development of the same pitch as the said helicoidal surface on which the driving member rises.

3. In an electricity meter for maximum load indication, a helicoidal surface, a driving member adapted to rise along the said surface, a drum driven by said driving member and provided with a graduated scale which is a helicoidal development of the same pitch as the said surface, a ratchet wheel mounted on said drum, a pawl engaging said ratchet wheel to retain said drum in the attained position at the end of an observation period, and means to disengage said pawl from said ratchet wheel.

4. In an electricity meter for maximum load indication, a helicoidal surface, a driving member adapted to rise along said surface, a drum driven by said driving member and provided with a graduated scale which is a helicoidal development of the same pitch as said helicoidal surface, a ratchet wheel mounted on said drum, a pawl engaging said ratchet wheel, an outer casing enclosing the indicating device and having an opening provided with a sight-line permitting to take the reading of the indication, and means to disengage said pawl from said ratchet wheel from a point outside of said casing.

In testimony whereof I affix my signature.

ONÉSIME BOREL.